United States Patent [19]
Iwahashi et al.

[11] Patent Number: 5,070,515
[45] Date of Patent: Dec. 3, 1991

[54] METHOD AND APPARATUS FOR PROCESSING DIGITAL SIGNAL

[75] Inventors: Naoto Iwahashi; Kenzo Akagiri, both of Kanagawa; Hiromi Setoguchi, Tokyo, all of Japan

[73] Assignee: Sony Corporation, Tokyo, Japan

[21] Appl. No.: 317,290

[22] Filed: Feb. 28, 1989

[30] Foreign Application Priority Data

Feb. 29, 1988 [JP] Japan .................. 63-046595
Mar. 14, 1988 [JP] Japan .................. 63-061724

[51] Int. Cl.$^5$ .......................... H04B 14/06
[52] U.S. Cl. ........................ 375/27; 341/76
[58] Field of Search ............. 375/25, 26, 27, 34; 341/77, 76, 143

[56] References Cited

U.S. PATENT DOCUMENTS

| | | | |
|---|---|---|---|
| 4,437,087 | 3/1984 | Petr | 341/76 |
| 4,475,227 | 10/1984 | Belfield | 341/76 |
| 4,571,737 | 2/1986 | Nishitani et al. | 341/76 |
| 4,677,423 | 6/1987 | Benvenuto et al. | 341/76 |
| 4,686,512 | 8/1987 | Nakamura et al. | 341/76 |

*Primary Examiner*—Benedict V. Safourek
*Attorney, Agent, or Firm*—Hill, Van Santen, Steadman & Simpson

[57] ABSTRACT

A method and an apparatus for processing a digital signal by calculating a predictive error, then requantizing the predictive error thus obtained, and correcting the spectral form of requantization noise generated in quantizing the predictive error, wherein the spectral form of such requantization noise is approximated to that of the input signal while being suppressed in the lower frequency band thereof. In particular, there is disclosed a digital signal processing apparatus comprising a predictive filter with a feedback loop, a requantizer for requantizing a difference signal between an input signal and the output signal of the predictive filter, and an inverse requantizer for requantizing the output signal of the requantizer with an inverse characteristic thereto and supplying the inversely requantized signal to the predictive filter, wherein the input signal of the requantizer and the output signal of the inverse requantizer supplied to the predictive filter are each weighted by a predetermined amount individually and then are outputted to the predictive filter.

7 Claims, 15 Drawing Sheets

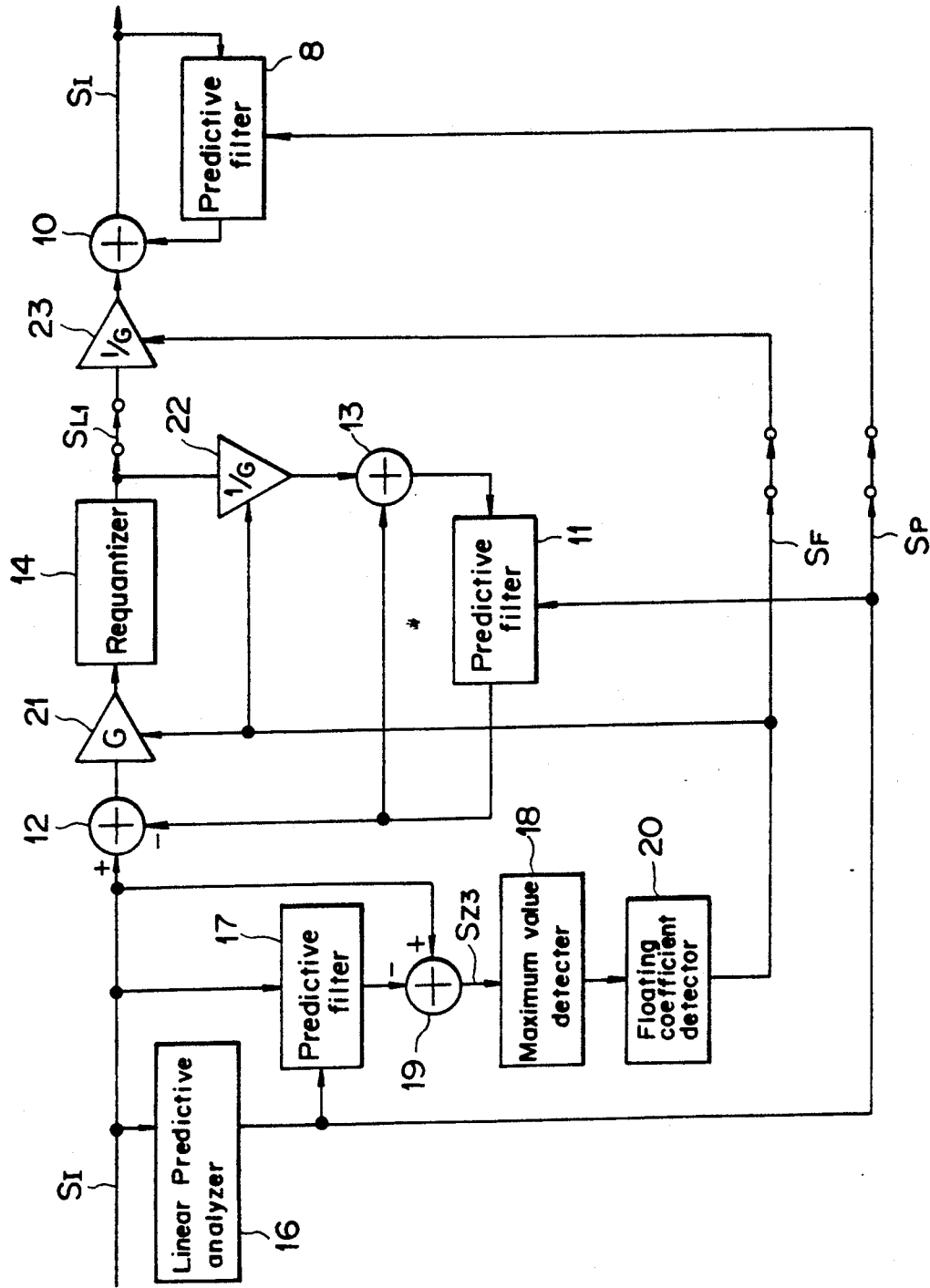

METHOD AND APPARATUS FOR PROCESSING DIGITAL SIGNAL

BACKGROUND OF THE INVENTION

1. Field of the Invention

The present invention relates to a method and an apparatus for processing a digital signal and, more particularly, to a method and an apparatus adapted for use in recording, reproducing and transmitting an audio signal or the like with a high quality.

2. Description of the Prior Art

In the digital signal processing apparatus of the type mentioned, there are known some conventional examples employing the technique of adaptive predictive coding (APC) for transmission of an audio signal so as to achieve a high efficiency in the transmission while preventing deterioration of the signal-to-noise ratio and the articulation, as disclosed in Japanese Patent Laid-open Nos. 59-223033, 60-223034, 61-158217 and 61-158218.

In feedforward type and feedback type digital signal processing apparatus designed for transmitting an input digital signal by the use of such adaptive predictive coding, the input digital signal is requantized by the technique of linear predictive coding (LPC).

When the signal is requantized on the transmitting side in the digital signal processing apparatus of the type mentioned above, it is impossible to avert generation of some noise (hereinafter referred to as requantization noise). For the purpose of solving this problem, there are proposed contrivances to improve the aural signal-to-quantization noise ratio (SNR) by applying the technique of noise shaping. (IEEE Transaction on Acoustics, Speech, and Signal Processing, Vol. ASSP-27, No. 3, June 1979; Journal of Electronic Data Communication Society, Apr. 1987, Vol. 70 No. 4, pp. 392–400; Japanese Patent Laid-open Nos. 59-223032, 60-103746 and 61-158220).

In the feedback type digital signal processing apparatus where merely a single predictive filter is employed, the entire constitution can be simplified as compared with the feedforward type digital signal processing apparatus.

Therefore, similarly to the case of applying the noise shaping means to the feedforward type digital signal processing apparatus, application of such noise shaping means to the feedback type digital signal processing apparatus is considered effective to simplify the apparatus constitution as a whole.

However, in applying the noise shaping means to the feedback type digital signal processing apparatus, there occurs the necessity of executing complicated selective switchover of the noise filter characteristic simultaneously with the predictive filter in conformity to the input digital signal, hence raising another problem that renders the whole constitution intricate and prolongs the required processing time.

Furthermore, in both feedforward type and feedback type, it has been impossible heretofore to attain sufficient improvements by merely adjusting the noise shaping characteristic to be coincident with the input signal frequency characteristic.

Since the masking effect has unsymmetrical characteristic to the frequency, satisfactory effect is achievable in case the noise frequency is higher than the audio signal frequency. In contrast therewith, when the noise frequency is lower than the audio signal frequency, the masking effect is diminished to consequently bring about a problem of causing deterioration in the aural signal-to-quantization noise ratio.

OBJECTS AND SUMMARY OF THE INVENTION

It is therefore an object of the present invention to provide a digital signal processing method and apparatus capable of eliminating the aforementioned drawbacks observed in the prior art.

Particularly a principal object of the present invention resides in providing an enhanced digital signal processing method and apparatus having a simplified constitution as a whole with an effective noise shaping function.

Another object of the invention is to provide a feedback type digital signal processing method and apparatus of a simplified constitution equipped with a noise shaping function.

And a further object of the invention is to provide a digital signal processing method and apparatus capable of improving the aural signal-to-quantization noise ratio.

According to one aspect of the present invention, there is provided a digital signal processing method comprising a step of calculating a predictive error, a step of requantizing the predictive error, and a step of correcting the spectral form of requantization noise generated in the step of requantizing the predictive error, wherein the spectral form of such requantization noise is approximated to that of the input signal while being suppressed in the lower frequency band thereof.

According to another aspect of the invention, there is provided a digital signal processing apparatus comprising a predictive filter with a feedback loop, requantizer means for requantizing a difference signal between an input signal and the output signal of the predictive filter, and inverse requantizer means for requantizing the output signal of the requantizer means with an inverse characteristic thereto and supplying the inversely requantized signal to the predictive filter, wherein the input signal of the requantizer means and the output signal of the inverse requantizer means supplied to the predictive filter are each weighted by a predetermined amount individually and then are outputted to the predictive filter.

According to a further aspect of the invention, there is provided a digital signal processing apparatus comprising a predictive error filter, requantizer means for requantizing the output signal of the predictive filter, and noise shaping means for correcting the spectral form of requantization noise generated during the requantization, wherein the spectral form of the requantization noise is approximated to that of the input signal while being suppressed in the lower frequency band.

According to a still further aspect of the invention, there is provided a digital signal processing apparatus comprising a plurality of predictive filters and predictive error detection means for producing difference signals between an input signal and the individual output signals of the plurality of predictive filters, the input signal being supplied to the predictive filters and encoded by selectively requantizing the difference signal, wherein the predictive filters are so designed as to render one of the difference signals equal in frequency characteristic to the input signal, and in the stage of selectively requantizing the difference signal obtained from the predictive filter, the lower-frequency component of the requantization error signal generated due to such requantization is suppressed.

According to an even further aspect of the invention, there is provided a digital signal processing apparatus comprising a predictive filter, predictive error detector means for outputting a difference signal between the input signal and the output signal of the predictive filter, requantizer means for requantizing the difference signal, and a noise filter for feeding back to the requantizer means the requantization error signal generated during the requantization, wherein the order of the noise filter is set to be higher than that of the predictive filter.

According to another aspect of the invention, there is provided a digital signal processing apparatus comprising a predictive filter for selectively switching the filter characteristic in accordance with the spectral form of an input signal, predictive error detector means for outputting a difference signal between the input signal and the output signal of the predictive filter, requantizer means for requantizing the difference signal, and a noise filter for feeding back to the requantizer means the requantization error signal generated during the requantization, wherein, when the characteristic of the predictive filter is switched to the other characteristic for selecting a small predictive gain in the mid and lower frequency bands, the characteristic of the noise filter is also switched to raise the distribution of the requantization error signal to the higher frequency band.

BRIEF DESCRIPTION OF THE DRAWINGS

FIG. 3 is a block diagram of an exemplary circuit constitution of the apparatus shown in FIG. 2;

DETAILED DESCRIPTION OF THE PREFERRED EMBODIMENTS

First, general feedforward type and feedback type digital signal processing apparatus will be described below with reference to FIGS. 1 and 2.

Figure 1:
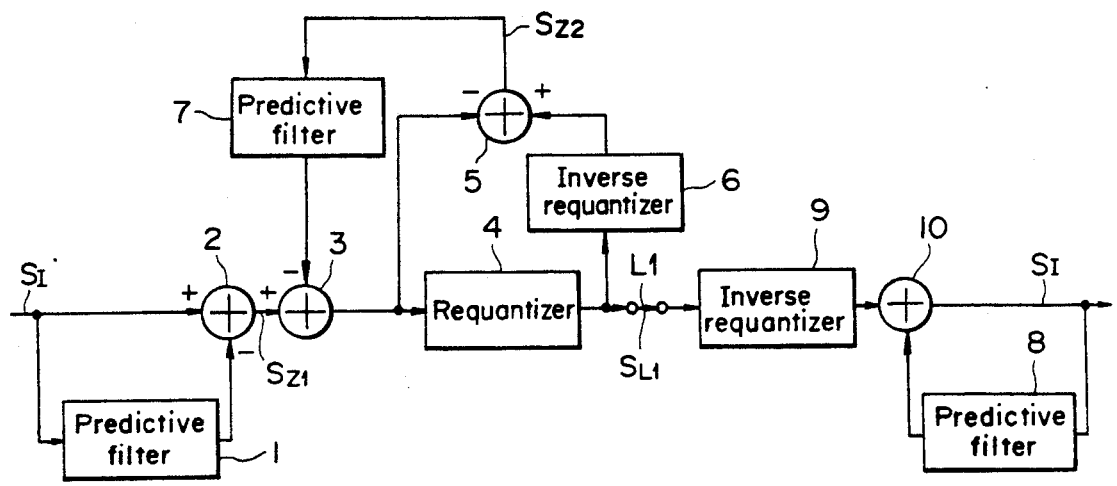
FIG. 1 is a block diagram of a conventional feedforward type digital signal processing apparatus.

In the feedforward type digital signal processing apparatus shown in FIG. 1, an input digital signal $S_I$ is supplied via a predictive filter 1 to a subtracter 2 to obtain a residual signal $S_{Z1}$ which corresponds to the deviation of the output signal of the predictive filter 1 from the input digital signal $S_I$.

Utilizing the fact that the audio signal as a time function retains a correlation between slightly spaced sampling points as well as between adjacent ones, the predictive filter 1 divides the input digital signal $S_I$ into predetermined segmental periods and detects the feature of the signal $S_I$ in each of such segmental periods by linear predictive coding, and the filter characteristic is selectively switched in accordance with the detected signal feature.

It becomes therefore possible to obtain, from the subtracter 2, the residual signal $S_{Z1}$ which corresponds to the linear predictive residual of the input digital signal $S_I$ to such feature.

Further in the digital signal processing apparatus, the residual signal $S_{Z1}$ is outputted to a transmission line L1 via a subtracter 3 and a requantizer 4, and its output signal is fed, together with the input signal supplied to the requantizer 4, to a subtracter 5 via an inverse requantizer 6 having a characteristic inverse to that of the requantizer 4, so that a difference signal $S_{Z2}$ is obtained from the subtracter 6. The signal $S_{Z2}$ is then inputted to the subtracter 3 via a predictive filter 7 having the same characteristic as that of the predictive filter 1.

Consequently in the transmission line L1, the residual signal $S_{Z1}$ corresponding to the linear predictive residual of the input digital signal $S_I$ is requantized and transmitted, whereby the input digital signal $S_I$ can be transmitted with data compression of an amount derived from the transmission of the input digital signal $S_I$ in the form of the residual signal $S_{Z1}$.

Therefore on the receiving side, the transmitted signal $S_{L1}$ is decoded by means of a predictive filter 8 having the same characteristic as that of the predictive filter 1, an inverse requantizer 9 having the same characteristic as that of the inverse requantizer 6, and an adder 10, so that the input digital signal $S_I$ can be transmitted with a high efficiency.

Figure 2:
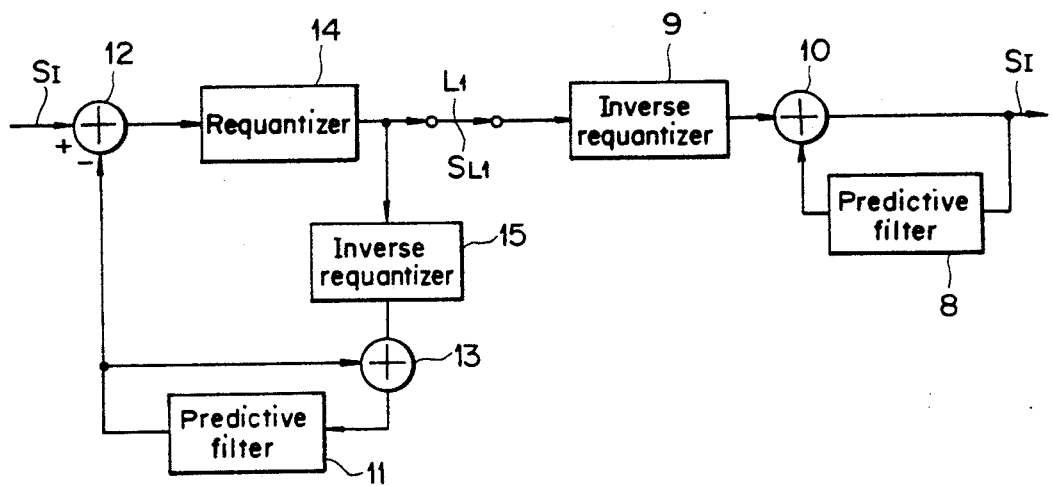
FIG. 2 is a block diagram of a conventional feedback type digital signal processing apparatus.

Meanwhile in the feedback type digital signal processing apparatus of FIG. 2, the input digital signal $S_I$ is outputted via a subtracter 12 and a requantizer 14, and its output signal $S_{L1}$ is fed to a predictive filter 11 via an inverse requantizer 15 and an adder 13.

Subsequently the output signal of the predictive filter 11 is supplied to both the subtracter 12 and the adder 13 to form a feedback loop relative to the predictive filter 11, and the transmitted signal $S_L$ is fed back via the predictive filter 11, so that the input digital signal $S_I$ is encoded by the technique of adaptive predictive coding. And the receiving side is constituted similarly to the configuration of FIG. 1.

Thus, in the feedback type digital signal processing apparatus also, the input digital signal $S_I$ can be transmitted with a high efficiency as well as in the feedforward type digital signal processing apparatus.

More specifically, as shown in FIG. 3 representing an exemplary circuit of a feedback type digital signal processing apparatus, an input digital signal $S_I$ is fed to a linear predictive analyzer 16, which then detects the spectral form of the input digital signal $S_I$ per predetermined period.

The linear predictive analyzer 16 produces, in accordance with the result of such detection, a predictive filter parameter signal $S_P$ which serves as a switching signal for the coefficients of the predictive filters 17 and 11, so that the transmitted signal $S_{L1}$ is encoded, in conformity with the spectral form of the input digital signal $S_I$, by a selected mode with the highest compression efficiency out of straight PCM (pulse code modulation), sum PCM and difference PCM.

A maximum value detector 18 receives a residual signal $S_{Z3}$ which corresponds to the difference between the input digital signal $S_I$ and the output signal of the predictive filter 17 obtained via a subtracter 19, then detects the maximum value of the residual signal $S_{Z3}$ and feeds the detection output to a floating coefficient detector 20.

In response to the output signal of the maximum value detector 18, the floating coefficient detector 20 sends a floating coefficient signal $S_F$ to a multiplier 21 inserted between the subtracter 12 and the requantizer 14, whereby an input signal corrected to a predetermined dynamic range is fed to the requantizer 14.

Furthermore a multiplier 22 having a characteristic inverse to that of the multiplier 21 is inserted between the requantizer 14 and the adder 13, so that the output signal of the requantizer 14 is floated inversely by an amount corresponding to the float caused in the input signal of the requantizer 14 by the multiplier 21.

Thus the predictive filter parameter signal $S_P$ and the floating coefficient signal $S_F$ are transmitted, together with the signal $S_{L1}$, to the receiving side and then are decoded by means of a predictive filter 8 and a multiplier 23 respectively having the same characteristic as that of the predictive filter 11 and the multiplier 22, whereby the input digital signal $S_I$ can be transmitted with data compression.

Also in FIG. 1, a noise filter is employed in place of the predictive filter 7, and the difference signal $S_{Z2}$ (i.e. requantization error signal resulting from the requantization) between the input signal of the requantizer 4 obtained from the subtracter 5 and the output signal of the inverse requantizer 6 is fed back so that the flat spectral form of the residual signal $S_{Z1}$ is changed in accordance with the spectral form of the input digital audio signal $S_I$, whereby the spectral form of the requantization noise is approximated to that of the audio signal.

Suppose now that the predictive filter 1 and the noise filter 7 have the frequency characteristics P(z) and F(z) respectively in comparison with the flat frequency characteristic $\Delta$, in which z is given by the following equation:

$$z = exp(j\omega t) \ldots \qquad (1)$$

Then the frequency characteristic $S_s$ relative to the audio signal, i.e. input digital signal $S_I$, is expressed as $$S_s = \Delta \cdot \left( \frac{1}{1 - P(z)} \right) \qquad (2)$$

And the frequency characteristic $N_s$ relative to the requantization noise generated in the stage of requantization is expressed as $$N_s = \Delta \cdot \left( \frac{1 - F(z)}{1 - P(z)} \right) \qquad (3)$$

Therefore, if the frequency characteristic F(z) of the noise filter 7 is maintained in the following relationship by the use of a constant $\alpha$ with respect to the frequency characteristic P(z) of the predictive filter 1:

$$F(z) = P(z/\alpha) \qquad (4)$$

then, substituting the above for Eq. (3), the frequency characteristic $N_s$ of the requantization noise can be expressed as $$N_s = \Delta \cdot \left( \frac{1 - P(z/\alpha)}{1 - P(z)} \right) \qquad (5)$$

Figure 4:
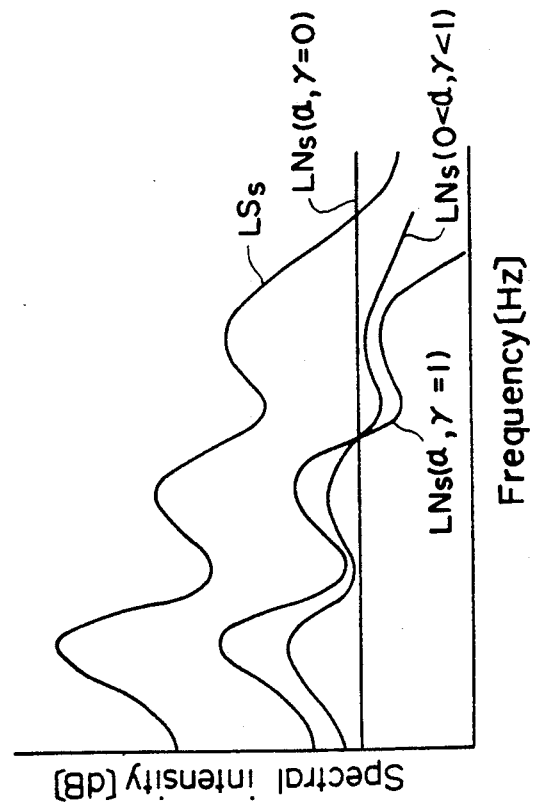
FIG. 4 is a characteristic curve diagram graphically representing the spectral forms of requantization noise.

Thus, as shown in FIG. 4, it becomes possible to approximate the spectral form $LN_s$ of the requantization noise to the spectral form $LS_s$ of the audio signal in accordance with the value of the constant $\alpha$, hence improving the aural signal-to-quantization noise ratio (SNR) by utilizing the masking effect.

Accordingly, a further data compression is attainable correspondingly to the improvement of the signal-to-quantization noise ratio in transmission of the input digital signal $S_I$.

Hereinafter an exemplary embodiment of the digital signal processing method and apparatus according to the present invention will be described in detail with reference to FIG. 5.

Figure 5:
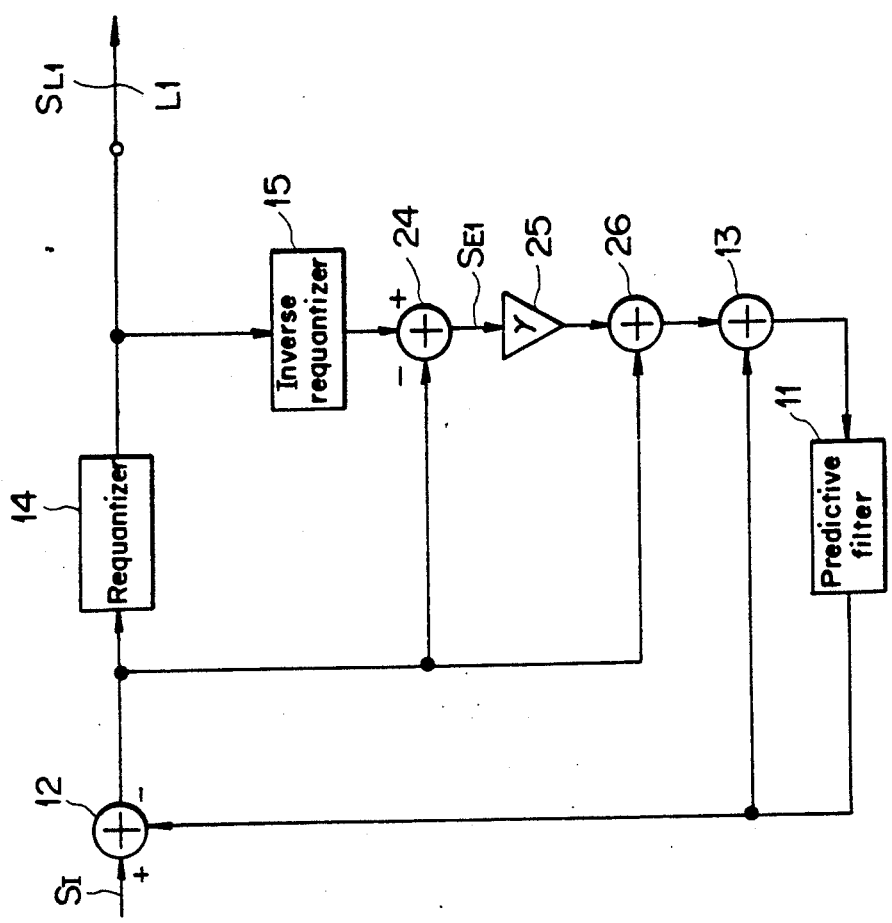
FIG. 5 is a block diagram showing a first embodiment of the digital signal processing apparatus of the present invention.

In FIG. 5 where component elements corresponding to those used in FIG. 2 are denoted by the same reference numerals and symbols, a feedback type digital signal processing apparatus is equipped with a noise shaping function and produces, by means of a subtracter 24, a quantization error signal $S_{E1}$ which represents the difference between the input signal of a requantizer 14 and the output signal of an inverse requantizer 15.

Further in this digital signal processing apparatus, the quantization error signal $S_{E1}$ is weighted by a value $\gamma (0 < \gamma < 1)$ through a multiplier 25 and then is supplied to an adder 26 so as to be added to the input signal of the requantizer 14, and the resultant signal is fed back to an adder 13 and a predictive filter 11.

Consequently the adder 13 receives the quantization error signal $S_{E1}$ weighted by a value $(1 - \gamma)$ in addition to the output signal of the inverse requantizer 15, whereby the input signal of the requantizer 14 and the output signal of the inverse requantizer 15 each weighted by a predetermined value individually are fed back to the requantizer 14 via the predictive filter 11.

Figure 6:
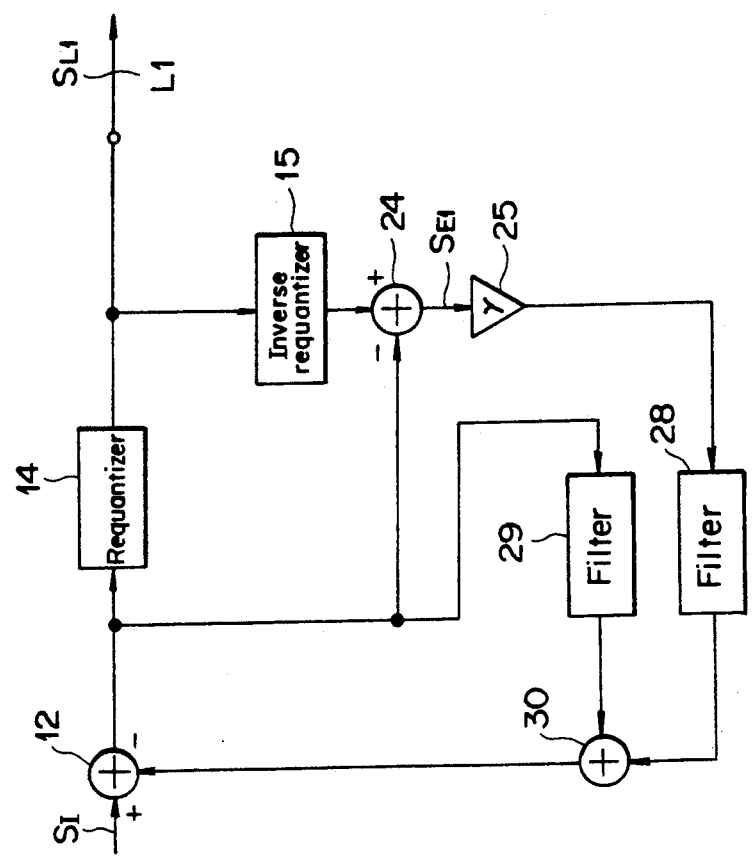
FIGS. 6 through 10 are block diagrams showing equivalent circuits of the first embodiment.

Accordingly, as shown in an equivalent circuit of FIG. 6, the adder 13 and the predictive filter 11 having the frequency characteristic P(z) can be replaced with an equivalent filter 27 having a frequency characteristic P(z) / (1 − P(z)).

Figure 7:
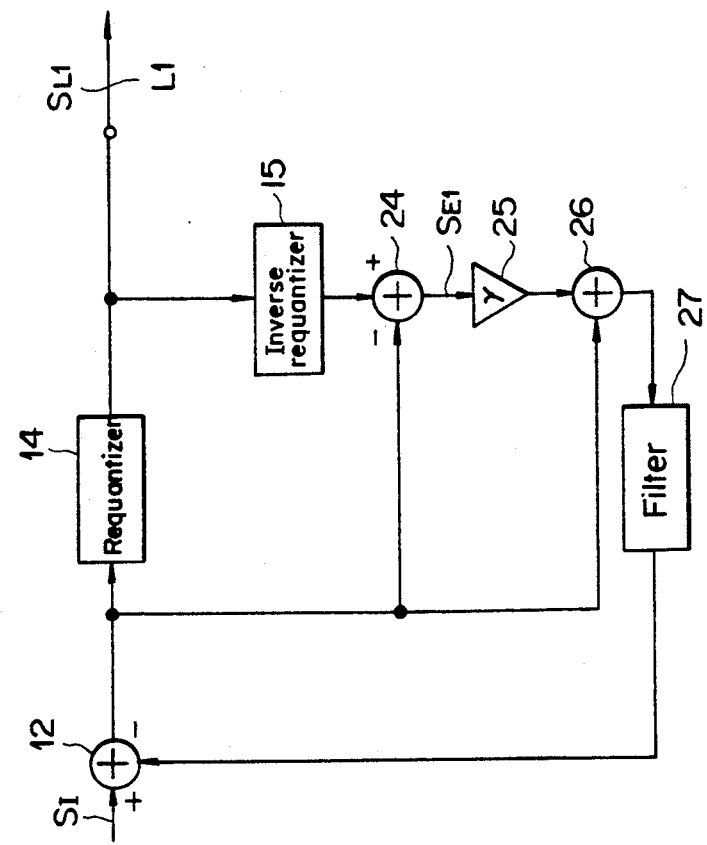

Furthermore, as shown in an equivalent circuit of FIG. 7 where the input signals supplied to the adder 26 are represented separately, the filter 27 and the adder 26 can be replaced with a filter 28 having a frequency characteristic P(z) / (1−P(z)), a filter 29 having a frequency characteristic 1 / (1−P(z)), and an adder 30.

Figure 8:
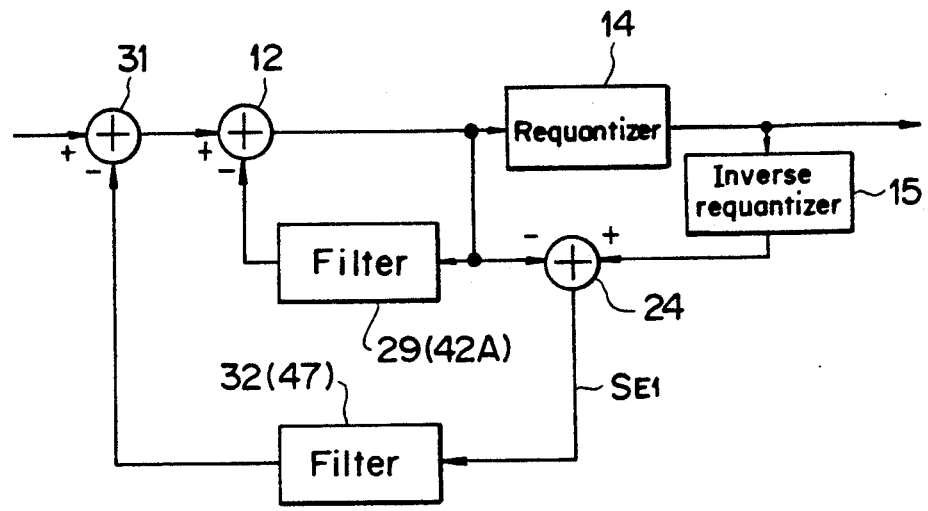

Therefore, as shown in FIG. 8, the filter 28 and the multiplier 25 can be replaced with a filter 32 having a frequency characteristic γP(z) / (1−P(z)); and also the adder 30 can be replaced with a subtracter 31.

Figure 9:
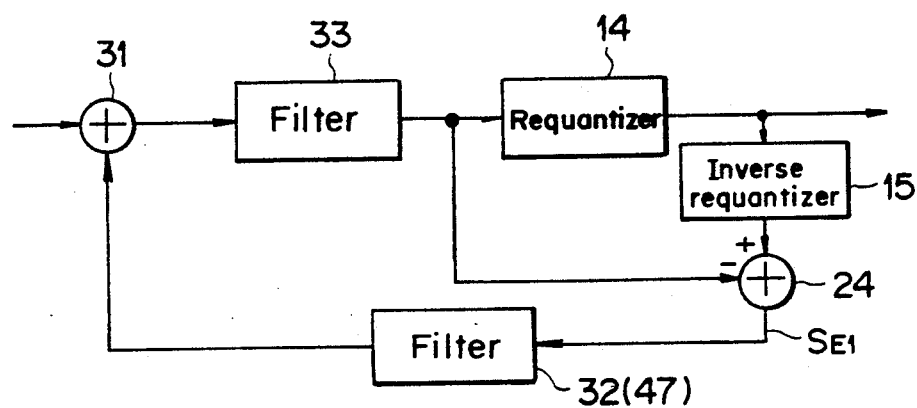
Figure 10:
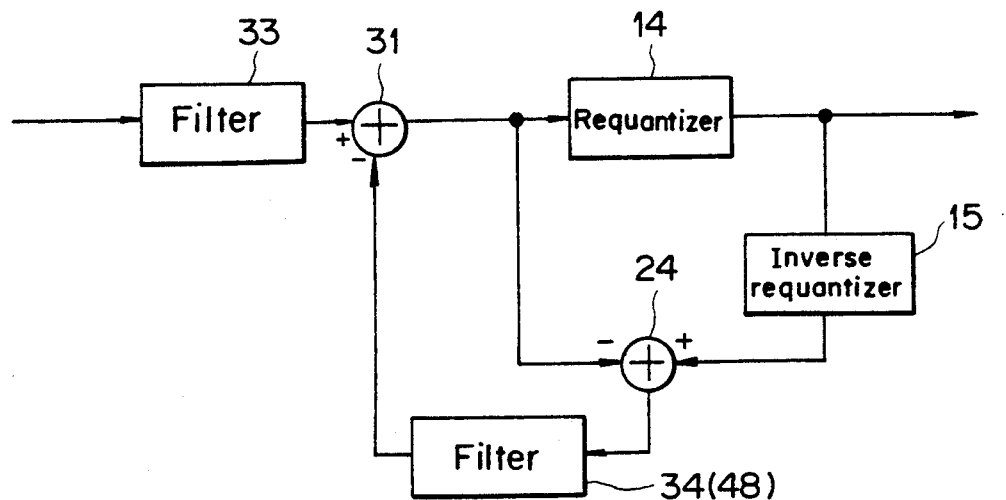

Besides the above, as shown in equivalent circuits of FIGS. 9 and 10, the filter 29 and the subtracter 12 can be replaced with a single filter 33 having a frequency characteristic (1−P(z)). And if such filter 33 is shifted onto the input side of the subtracter 31 as represented by an equivalent circuit, the filter 32 having the frequency characteristic γP(z) / (1−P(z)) is replaceable with a filter 34 having a frequency characteristic γP(z) and can be represented by an equivalent circuit having the constitution of FIG. 1.

Therefore, substituting the frequency characteristic γP(z) of the filter 34 for the frequency characteristic F(z) of the noise filter 7 in Eq. (3), the frequency characteristic $N_s$ relative to the requantization noise is expressed as $$N_s = \Delta \cdot \left( \frac{1 - \gamma \cdot P(z)}{1 - P(z)} \right) \quad (6)$$

Accordingly, as graphically shown in FIG. 4, the spectral form $LN_s$ of the requantization noise can be approximated to the spectral form $LS_s$ of the audio signal in conformity with the value of the weighting coefficient γ, whereby a noise shaping function is achieved to realize improvement in the aural signal-to-quantization noise ratio (SNR) by utilizing the masking effect.

Thus, without the necessity of using a noise filter which switches the operation intricately with the predictive filter 11 shown in FIGS. 2 and 5, the noise shaping function can be attained in a simple configuration where the quantization error signal $S_{E1}$ is merely weighted and fed back to the predictive filter 11 together with the input signal of the requantizer 14, hence simplifying the entire apparatus constitution to consequently shorten the required processing time.

If the weighting coefficient γ is set to a value 1, the output signal of the inverse requantizer 15 alone can be fed back to the predictive filter 11, as in the operation of the conventional feedback type digital signal processing apparatus which is not equipped with any noise shaping function.

In the constitution of FIG. 5, the quantization error signal $S_{E1}$ obtained via the subtracter 24 is weighted by a value γ through the multiplier 25 and then is outputted via the adder 26 to the predictive filter 11 together with the input signal of the requantizer 14, whereby both the output signal of the inverse requantizer 15 and the input signal of the requantizer 14 are weighted by a predetermined amount individually via the predictive filter 11 and then are fed back to the requantizer 14.

According to the constitution mentioned above, the input signal of the requantizer 14 and the output signal of the inverse requantizer 14 weighted by a predetermined amount individually are fed back to the predictive filter 11, so that the spectral form $LN_s$ of the quantization noise is approximated to the spectral form $LS_s$ of the audio signal while the input digital signal $S_I$ can be transmitted with data compression.

Thus, it becomes possible to accomplish an improved feedback type digital signal processing apparatus which has a simplified constitution as a whole with a noise shaping function and is capable of performing the operation in a short processing time.

Now a description will be given with regard to a second embodiment of the digital signal processing method and apparatus according to the present invention. First, the distinctive characteristic of masking effect will be explained below.

It is generally known that the acoustic sense becomes less keen practically in a frequency band above 9 kHz as compared with that in a lower frequency band. Therefore, the aural signal-to-quantization noise ratio can be enhanced by suppressing the requantization noise in the lower frequency band with emphasis of such noise in the higher frequency band.

Figure 11:
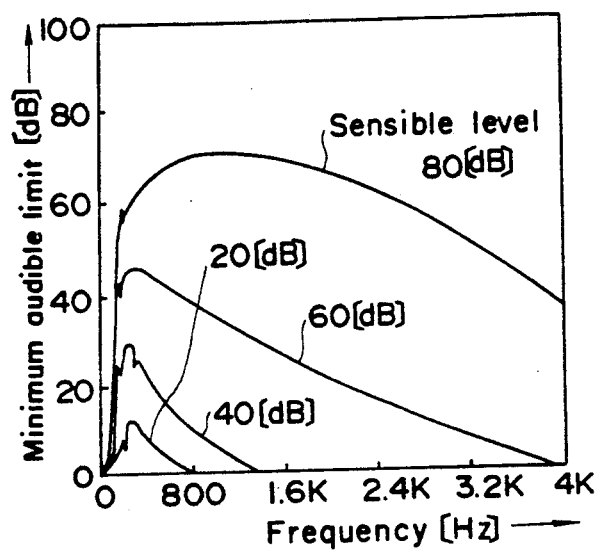
FIGS. 11 and 12 are characteristic curve diagrams graphically representing the masking effect.
Figure 12:
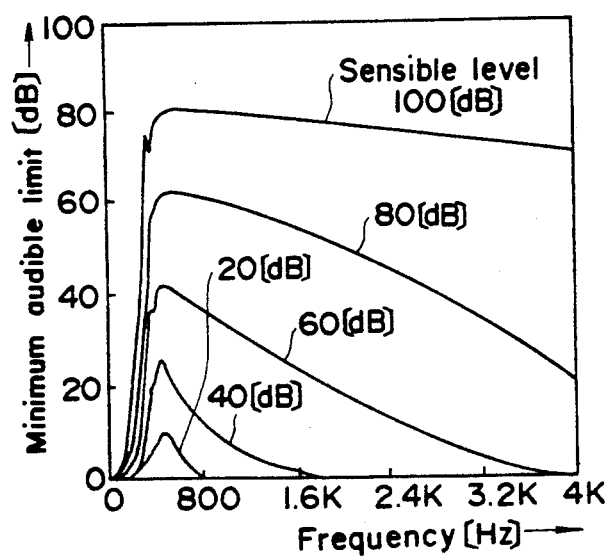

In FIGS. 11 and 12 which graphically show the masking effects for pure tones of frequencies 400 and 2400 kHz respectively, the masking effect has an unsymmetrical characteristic to frequencies, and satisfactory effect is achievable in case the noise frequency is higher than the audio signal frequency. In contrast therewith, the masking effect is diminished when the noise frequency is lower than the audio signal frequency.

Figure 13A:
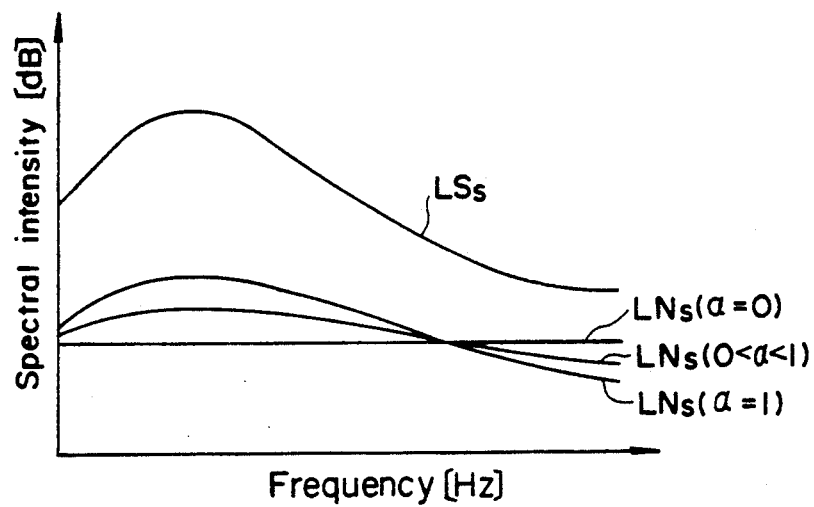
FIGS. 13A and 13B are characteristic curve diagrams graphically representing the spectral form of requantization noise.
Figure 13B:
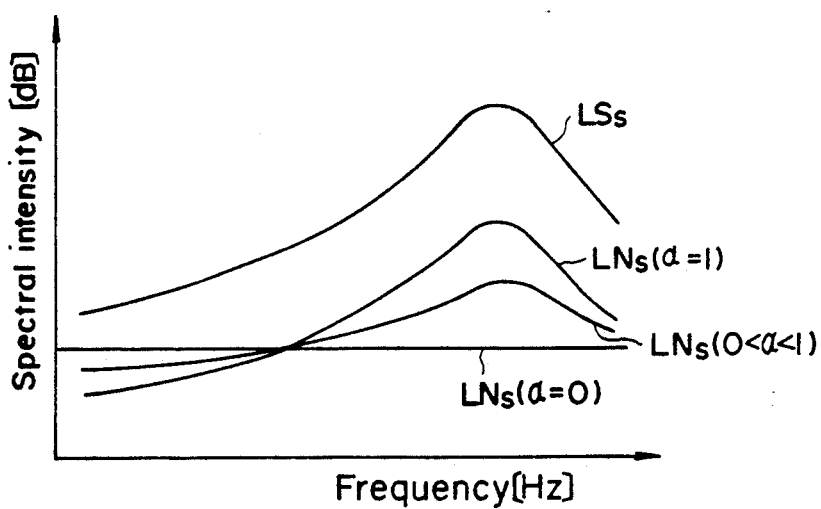

Therefore, in case the input audio signal has such a spectral form as shown in FIG. 13B with its components concentrated on the higher frequency side while the spectral form of the requantization noise is emphasized in the lower frequency band, the masking effect is diminished to consequently deteriorate the aural signal-to-quantization noise ratio.

Practically in the voice signal, its frequency spectrum is concentrated on the lower frequency side as compared with the audio signal, so that if the constant α is set to be smaller than a value 1 as shown in FIG. 13A, the spectral form of the requantization noise is suppressed in the lower frequency band while being emphasized in the higher frequency band, thereby increasing the signal level difference of the requantization noise to the voice signal in the lower frequency band.

Consequently, if the constant α is set to be close to a value 1 within a range where the signal level of the requantization noise is maintained under a predetermined value to the signal level of the voice signal, it is still possible to attain sufficient masking effect.

Meanwhile, if the constant α is set to be smaller than a value 1 when the spectral form of the audio signal is such as emphasized in the higher frequency band, then the spectral form of the requantization noise is suppressed and emphasized inversely to the aforementioned case of the voice signal, whereby the signal level difference of the requantization noise to the audio signal is decreased in the lower frequency band.

Therefore, if the constant α is set to be close to a value 1 within a range where the signal level of the requantization noise is kept under a predetermined value to the signal level of the audio signal level, it follows that the masking effect is deteriorated on the contrary.

Now a description will be given below with regard to a second embodiment of the digital signal processing method and apparatus according to the present invention.

Figure 14:
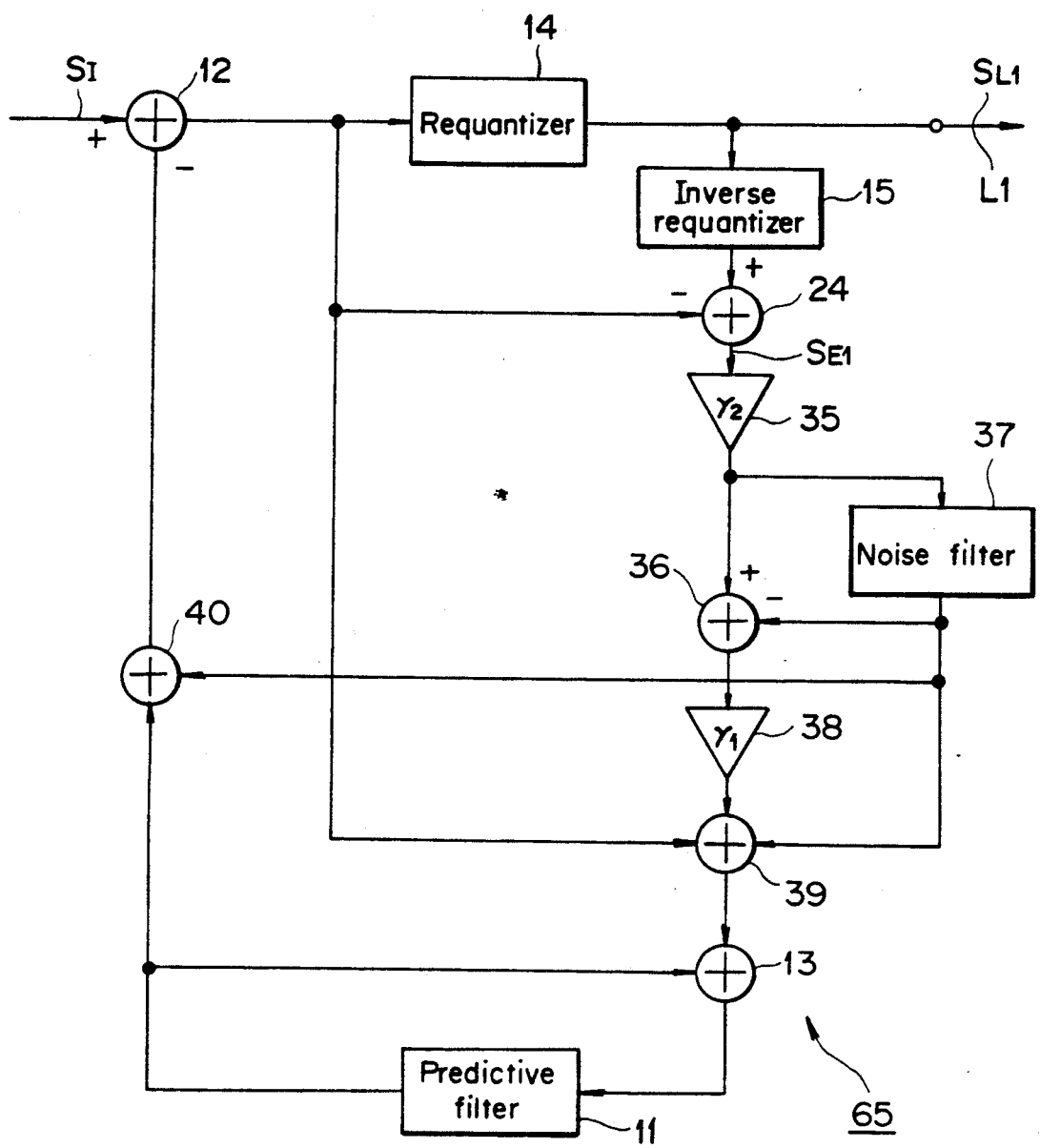
FIG. 14 is a block diagram showing a second embodiment of the invention.

In FIG. 14, a feedback type digital signal processing apparatus is equipped with a noise shaping function for approximating the spectral form of requantization noise to that of an audio signal while emphasizing the higher-frequency component thereof.

However, in the feedback type digital signal processing apparatus, its entire constitution becomes complicated due to the procedure of approximating the spectral form of requantization noise to that of the audio signal, and if such emphasis of the spectral form of the requantization noise in the higher frequency band thereof is to be executed in addition to the above approximation, there arises a problem that the entire constitution is rendered intricate to an extremely great extent.

In this embodiment, therefore, the quantization error signal $S_{E1}$ obtained via a subtracter 24 is weighted by a value $\gamma 2$ ($0 < \gamma 2 \leq 1$) through a multiplier 35 and subsequently a differential signal is obtained, by means of a subtracter 36, between the quantization error signal $S_{E1}$ weighted by a value $\gamma 2$ and the signal obtained via a noise filter 37.

The difference signal outputted from the subtracter 36 is weighted by a value $\gamma 1$ ($0 < \gamma 1 \leq 1$) in a multiplier 38 and then is supplied to an adder 39 where the quantization error signal $S_{E1}$ weighted by a predetermined amount, the output signal of the noise filter 37 and the input signal of the requantizer 14 are added to one another. And the output of the adder 39 is supplied to the adder 13 and the predictive filter 11.

Furthermore the output signal of the noise filter 37 is supplied to an adder 40 inserted between the subtracter 12 and the predictive filter 11.

Consequently the input signal of the requantizer 14 and the output signal of the inverse requantizer 15 are weighted by a predetermined value individually and then are supplied to the predictive filter 11, while the quantization error signal weighted by a predetermined value is supplied via the noise filter 37 to both the requantizer 14 and the predictive filter 11.

Figure 15:
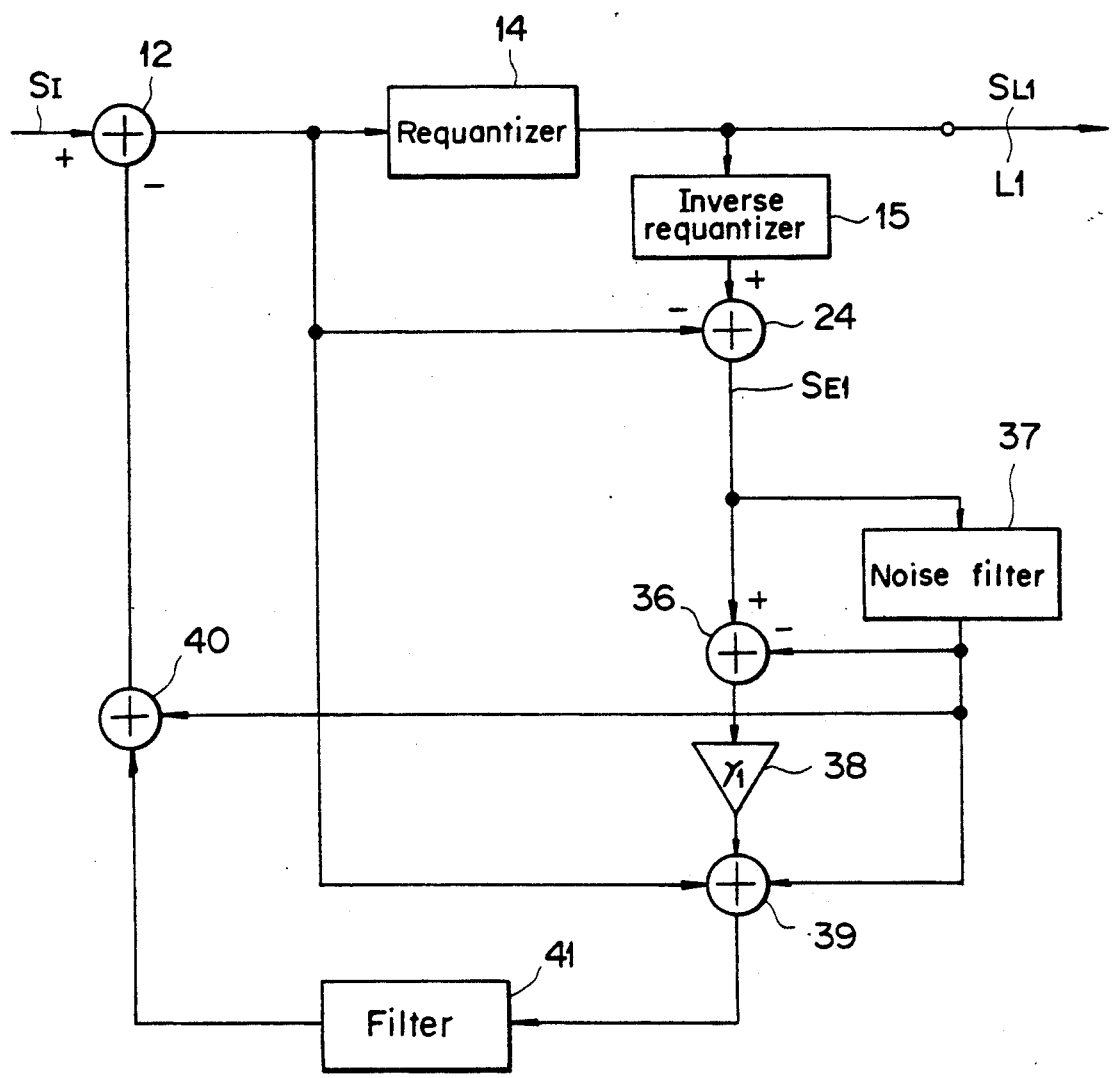
FIGS. 15 though 17 are block diagrams showing equivalent circuits of the second embodiment.

Therefore, in an equivalent circuit where the weighting coefficients $\gamma 2$ and $\gamma 1$ of the multipliers 35 and 38 have values 1 and $\beta$ respectively, the adder 13 and the predictive filter 11 having the frequency characteristic P(z) can be replaced, as shown in FIG. 15, with an equivalent filter 41 having a frequency characteristic $P(z) / (1 - P(z))$.

Figure 16:
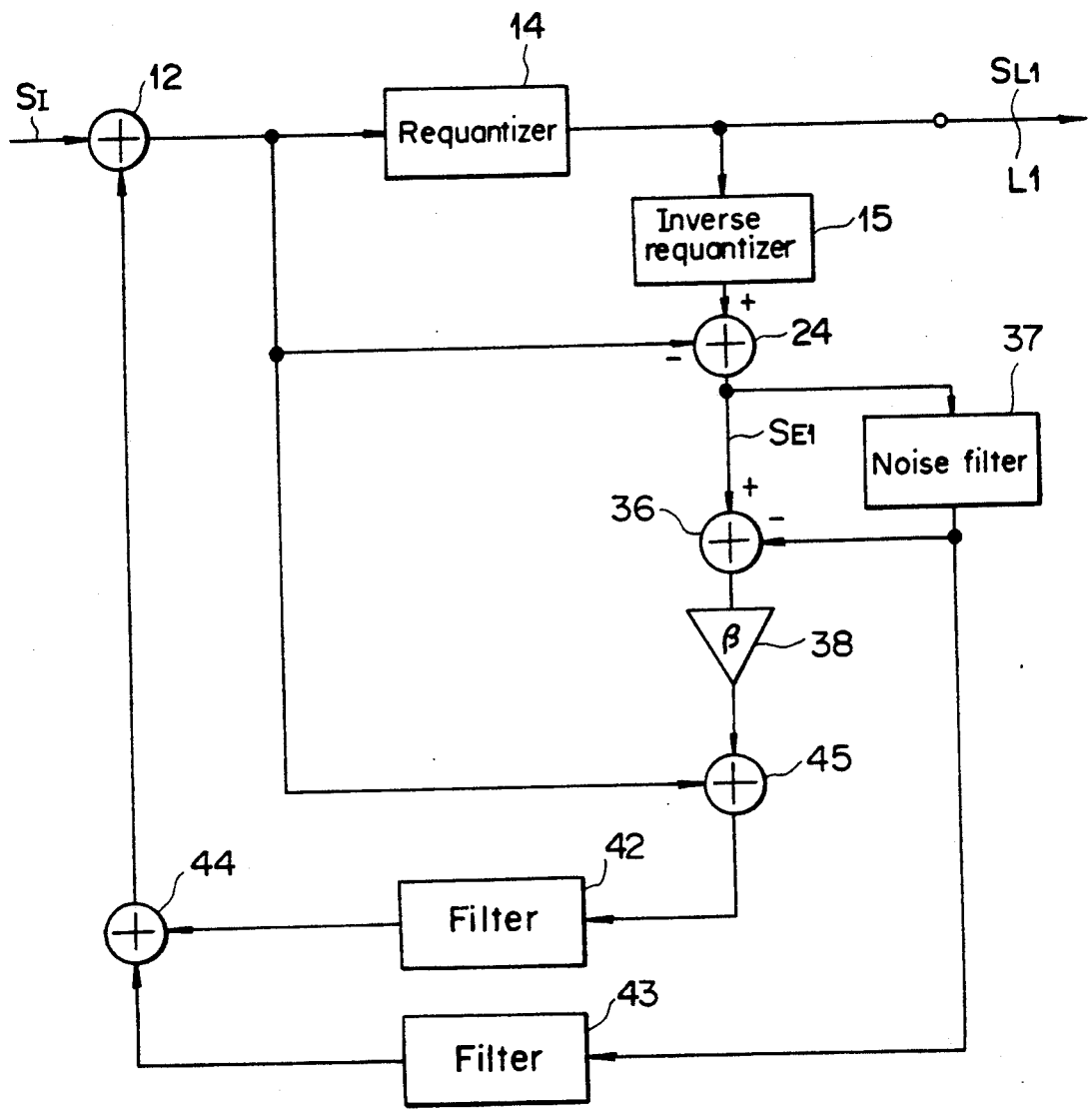

Furthermore, in an equivalent circuit 39 where the input signals supplied to the adder 39 via the noise filter 37 are represented separately, the filter 41 and the adder 39 can be replaced, as shown in FIG. 16, with a filter 42 having a frequency characteristic $P(z) / (1 - P(z))$, a filter 43 having a frequency characteristic $1 / (1 - P(z))$, and adders 44 and 45.

Figure 17:
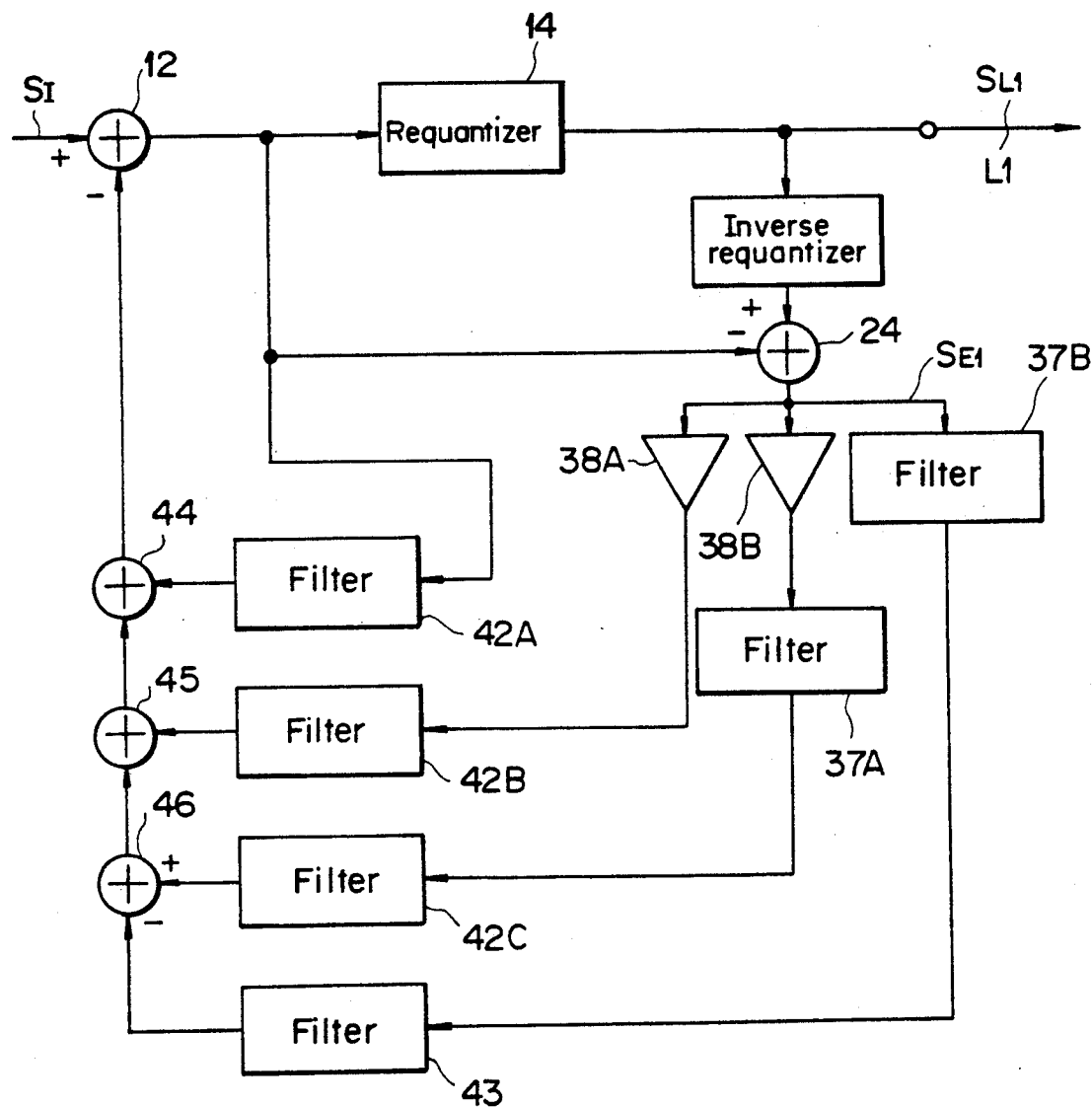

Besides the above, in an equivalent circuit where the input signals supplied to the adder 45 and the subtracter 36 are represented separately, the aforementioned subtracter 36, noise filter 37, multiplier 38 and adder 45 can be replaced, as shown in FIG. 17, with filters 37A and 37B having the same frequency characteristic F(z) as that of the noise filter 37, multipliers 38A and 38B having the same weighting coefficient $\beta$ as that of the multipliers 38, filters 42A and 42B and 42C having the same frequency characteristic $P(z) / (1 - P(z))$ as that of the filter 42, an adder 45 and a subtracter 46.

Accordingly, as shown in an equivalent circuit of FIG. 8 relative to the quantization error signal $S_{E1}$, the filters 37A, 37B, 42B, 42C and 43, the multipliers 38A and 38B, the adders 44 and 45 and the subtracter 46 can be replaced with a subtracter 31 and a filter 47 having a frequency characteristic F1(z) expressed as $$F1(z) = \frac{\beta \cdot P(z) - \beta \cdot P(z) \cdot F(z) + F(z)}{1 - P(z)} \quad (7)$$

Thus, as shown in FIGS. 9 and 10 similarly to the foregoing case of the first embodiment, the filter 42A and the subtracter 12 are combined with each other and can be replaced with a single filter 33 having a frequency characteristic $(1 - P(z))$. And if such filter 33 is shifted onto the input side of the subtracter 31 as represented by an equivalent circuit, the filter 47 having the frequency characteristic F1(z) is replaceable with a filter 48 having a frequency characteristic F2(z) of the filter 48 in Eq. (8) for the frequency characteristic F(z) in Eq. (3), the frequency characteristic $N_s$ relative to the requantization noise is expressed as $$F2(z) = \beta \cdot P(z) - \beta \cdot P(z) \cdot F(z) + F(z) \quad (8)$$

Therefore, substituting the frequency characteristic F2(z) of the filter 48 in Eq. (8) for the frequency characteristic F(z) in Eq. (3), the frequency characteristic $N_s$ relative to the requantization noise is expressed as $$\begin{aligned} N_s &= \Delta \cdot \left( \frac{1 - F2(z)}{1 - P(z)} \right) \\ &= \Delta \cdot \left( \frac{1 - \beta \cdot P(z) + \beta \cdot P(z) \cdot F(z) - F(z)}{1 - P(z)} \right) \\ &= \Delta \cdot \frac{1 - \beta \cdot P(z)}{1 - P(z)} \cdot (1 - F(z)) \end{aligned} \quad (9)$$

Figure 18:
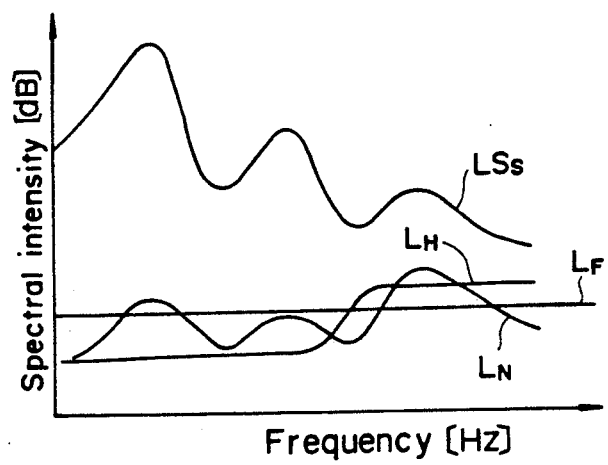
FIGS. 18, 19A and 19B are characteristic curve diagrams graphically representing the spectral form of requantization noise in the second embodiment.

In FIG. 18 where a flat frequency characteristic is represented by a straight line $L_F$ with the value $\Delta$, the frequency characteristic corresponding to the term $(1 - F(z))$ in the right-hand member of Eq. (9) can be represented by a curve LH with emphasis of the higher frequency band thereof due to selective setting of the frequency characteristic F(z) to a predetermined response.

In contrast with the above, the remaining term $(1 - \beta \cdot P(z)) / (1 - P(z))$ in the right-hand member of Eq. (9) represents the frequency characteristic approximated to the spectral form of the audio signal as in Eq. (3).

Figure 19A:
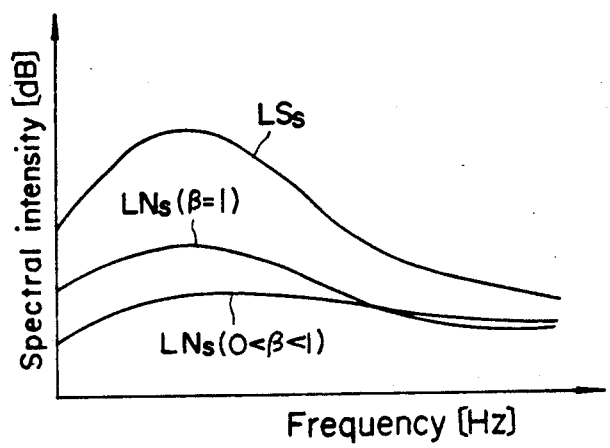
Figure 19B:
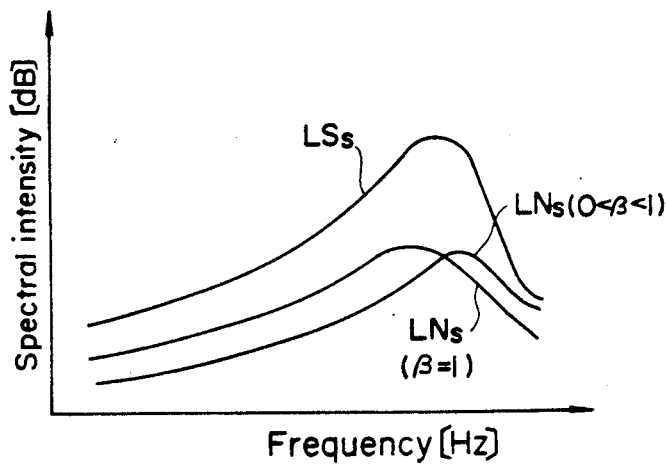

Therefore, as graphically shown in FIGS. 19A and 19B where the requantization noise frequency characteristic $N_s$ given by Eq. (9) is represented by a curve $LN_s$, the spectral form of the requantization noise is approximated to that of the audio signal while being emphasized in the higher frequency band. Accordingly, when the center frequency of the audio signal is distributed in the lower frequency band as shown in FIG. 19A or in the higher frequency band as shown in FIG. 19B, the center frequency of the requantization noise can be positioned in a higher frequency band as compared with the center frequency in the above distribution.

Consequently, with regard also to such input signal as an audio signal having a wide frequency band, it is still possible to attain sufficient masking effect by the use of a noise filter of a fixed frequency characteristic.

In case the weighting coefficients $\gamma 2$ and $\gamma 1$ of the multipliers 35 and 38 have values $\beta$ and 1 respectively, the frequency characteristic $N_s$ relative to the requantization noise can be expressed as $$N_s = \Delta \cdot \left( \beta(1 - F(z)) + \frac{1 - \beta}{1 - P(z)} \right) \quad (10)$$

so that the center frequency of the requantization noise can be selectively set as required with respect to that of the audio signal, and a proper noise shaping characteristic is rendered selectable with enhanced facility.

In the constitution of FIG. 14, the quantization error signal $S_{E1}$ obtained via the subtracter 24 is weighted by values $\gamma 2$ and $\gamma 1$ through the multipliers 35 and 38 respectively and then is inputted to the predictive filter 11 while being weighted by a predetermined amount through the noise filter 37 and inputted to both the predictive filter 11 and the requantizer 14.

The input signal of the requantizer 14 is further weighted by a predetermined amount and then is supplied to the predictive filter 11, whereby the above can be replaced with the equivalent circuit of FIG. 6.

Thus, when the weighting coefficients $\gamma 2$ and $\gamma 1$ of the multipliers 35 and 38 have values 1 and $\beta$ respectively as expressed in Eq. (9), the spectral form of the requantization noise is approximated to that of the audio signal while the higher-frequency component thereof is emphasized, and the input digital signal $S_I$ can be transmitted in such a state with data compression.

Meanwhile, in case the weighting coefficients $\gamma 2$ and $\gamma 1$ of the multipliers 35 and 38 have values $\beta$ and 1 respectively as expressed in Eq. (10), the input digital signal $S_I$ can be transmitted with data compression in a state where the proper noise shaping characteristic is selected with enhanced facility.

In the constitution of FIG. 12, the input signal of the requantizer 14 and the output signal of the inverse requantizer 15 weighted by a predetermined amount individually are supplied to the predictive filter 11, and the quantization error signal $S_{E1}$ is supplied via the noise filter 37 to both the predictive filter 11 and the requantizer 14, so that the input digital signal $S_I$ can be transmitted with data compression in a state where the spectral form of the requantization noise is approximated to that of the audio signal with emphasis of the higher frequency component.

Thus, due to employment of the noise filter having a fixed frequency characteristic, it becomes possible to achieve a noise shaping function with further complicated frequency characteristic, hence accomplishing an improved feedback type digital signal processing apparatus which has a simplified constitution as a whole with an enhanced noise shaping function and is capable of performing its operation in a short processing time.

Hereinafter a third embodiment of the digital signal processing method and apparatus of the present invention will be described with reference to FIG. 20.

Figure 20:
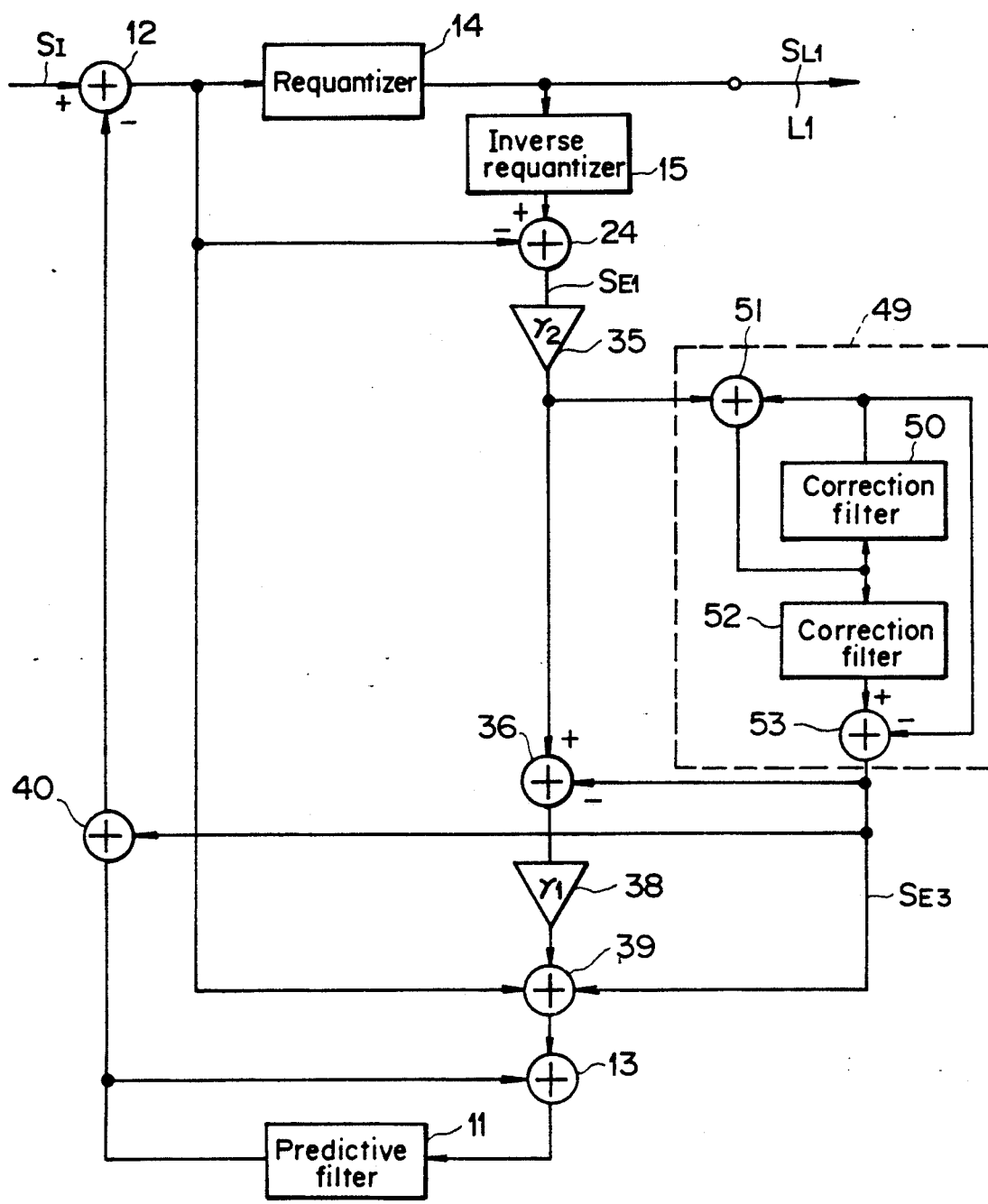
FIG. 20 is a block diagram showing a third embodiment of the invention.

FIG. 20 shows a feedback type digital signal processing apparatus, wherein the noise filter 37 (FIG. 14) is replaced with a filter unit 49 having a more complicated frequency characteristic so as to attain an enhanced noise shaping function with a further complicated frequency characteristic.

In the filter unit 49, the output signal of a correction filter 50 and the weighted quantization error signal $S_{E1}$ are supplied to an adder 51, whose output signal is then fed to both correction filters 50 and 52.

Furthermore, the output signals of the correction filters 50 and 52 are supplied via a subtracter 53 to both a subtracter 36 and an adder 39.

Accordingly, the frequency characteristic F2(Z) of the filter unit 49 can be expressed as follows in relation to the respective frequency characteristics A(Z) and B(Z) of the correction filters 50 and 52:

$$F2(Z) = \frac{B(Z) - A(Z)}{1 - A(Z)} \quad (11)$$

Therefore, when the weighting coefficients $\gamma 2$ and $\gamma 1$ of the multipliers 35 and 38 have values 1 and $\beta$ respectively as in the aforementioned case of the second embodiment, the frequency characteristic $N_s$ relative to the requantization noise can be represented by the following equation through substitution of the value F(z) in Eq. (9) for the value F2(Z) in Eq. (11):

$$N_s = \Delta \cdot \frac{1 - \beta \cdot P(z)}{1 - P(z)} \cdot \frac{1 - B(Z)}{1 - A(Z)} \quad (12)$$

Consequently an enhanced noise shaping function can be attained with a further complicated frequency characteristic.

Meanwhile, in case the weighting coefficients $\gamma 2$ and $\gamma 1$ of the multipliers 35 and 38 have values $\beta$ and 1 respectively, the frequency characteristic $N_s$ relative to the requantization noise can be expressed as follows through substitution of the value F2(Z) in Eq. (11) for the value F(z) in Eq. (10):

$$N_s = \Delta \cdot \left( \beta \cdot \frac{1 - B(Z)}{1 - A(Z)} + \frac{1 - \beta}{1 - P(z)} \right) \quad (13)$$

As a result, in comparison with the foregoing case of the second embodiment, it becomes possible to achieve an enhanced noise shaping function with a further complicated frequency characteristic.

According to the constitution of FIG. 20, the input signal of the requantizer 14 and the output signal of the inverse requantizer 15 weighted by a predetermined value individually are supplied to the predictive filter 11, and the quantization error signal $S_{E1}$ weighted by a predetermined amount is supplied to both the predictive filter 11 and the requantizer 14 via the filter unit 49 which consists of correction filters 50 and 52 and has a complicated frequency characteristic, thereby attaining an enhanced noise shaping function with a further complicated frequency characteristic in addition to the effects of the second embodiment.

Now a fourth embodiment of the digital signal processing method and apparatus of the present invention will be described below without reference to any drawing.

In the second and third embodiments mentioned above, the weighting coefficients $\gamma 2$ and $\gamma 1$ of the multipliers 35 and 38 are set to values $\beta$ and 1 and to values 1 and $\beta$, respectively. However, it is to be understood that the weighting coefficients $\gamma 2$ and $\gamma 1$ are not limited to such values alone, and any of various proper values may be selected in conformity with individual requirements.

Although the above embodiments have been described with regard to an exemplary case of transmitting an audio signal, the present invention is not restricted merely thereto and may also be applied, for example, to high-quality reproduction of an audio signal as in a compact disc apparatus, or to high-quality recording and reproduction of an audio signal as in a digital tape recorder.

Hereinafter a fifth embodiment of the digital signal processing method and apparatus of the present invention will be described with reference to FIGS. 21 and 22.

Figure 21:
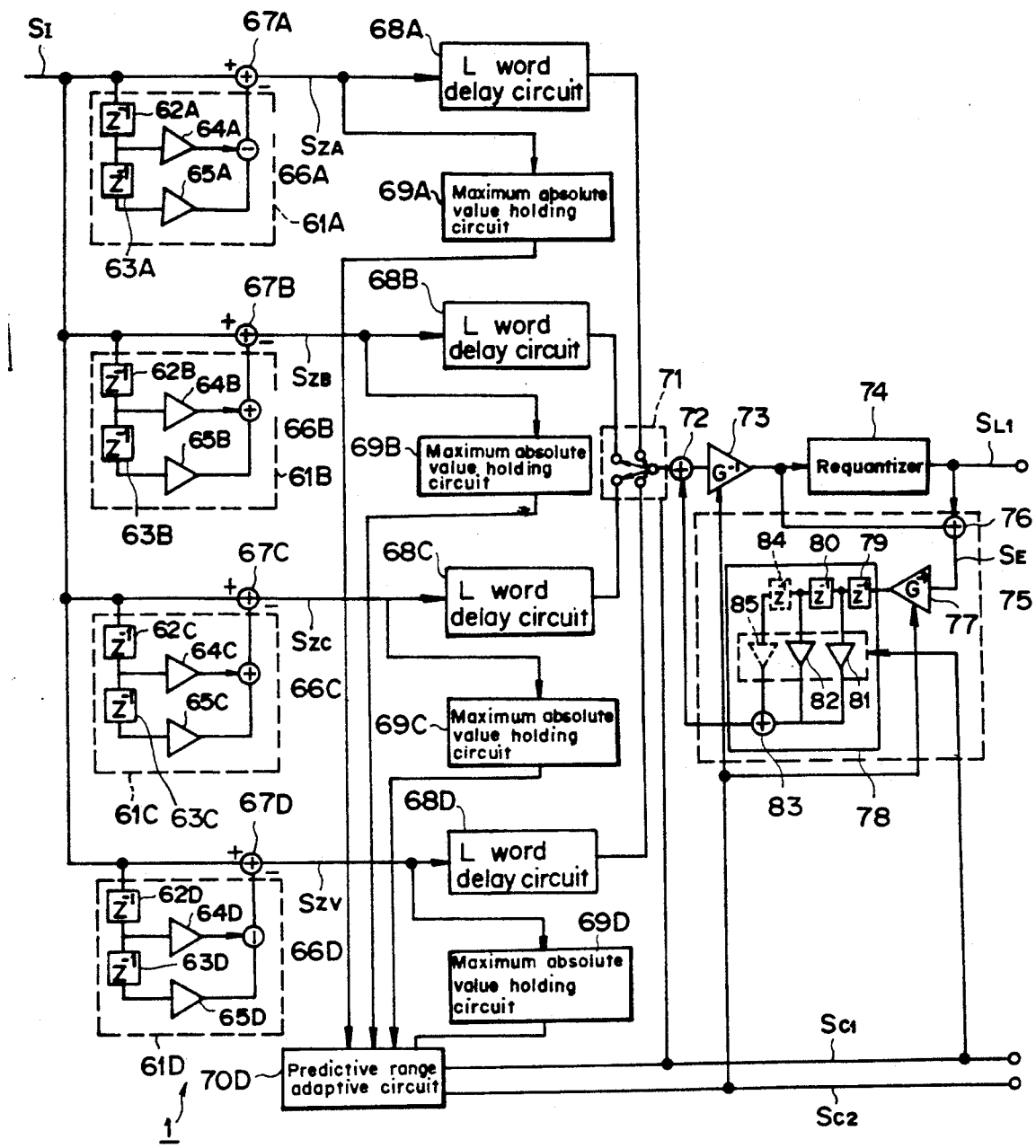
FIG. 21 is a block diagram showing a fifth embodiment of the digital signal processing method and apparatus of the invention.

In FIG. 21, the digital signal processing apparatus includes secondary filter circuits comprising predictive filters 61A, 61B, 61C, 61D which respectively consist of delay circuits 62A and 63A, 62B and 63B, 62C and 63C, 62D and 63D, weighting circuits 64A and 65A, 64B and 65B, 64C and 65C, 64D and 65D, and adders 66A, 66B, 66C, 66D. Weighting coefficients K1A and K2A, K1B and K2B, K1C, K1D and K2D of the weighting circuits 64A and 65A, 64B, 64C and 65C, 64D and 65D are set to values represented by the following equations:

$$K1A = 0, K2A = 0 \quad (14)$$
$$K1B = 0.9375, K2B = 0 \quad (15)$$
$$K1C = 1.796875, K2C = -0.8125 \quad (16)$$
$$K1D = 1.53125, K2D = -0.859375 \quad (17)$$

When an input digital signal $S_I$ is fed via the predictive filters 61A, 61B, 61C and 61D to subtracters 67A, 67B, 67C and 67D, there are obtained difference signals $S_{ZA}$, $S_{ZB}$, $S_{ZC}$ and $S_{ZD}$ between the input digital signal $S_I$ and the respective output signals of the predictive filters 61A, 61B, 61C and 61D.

Figure 22:
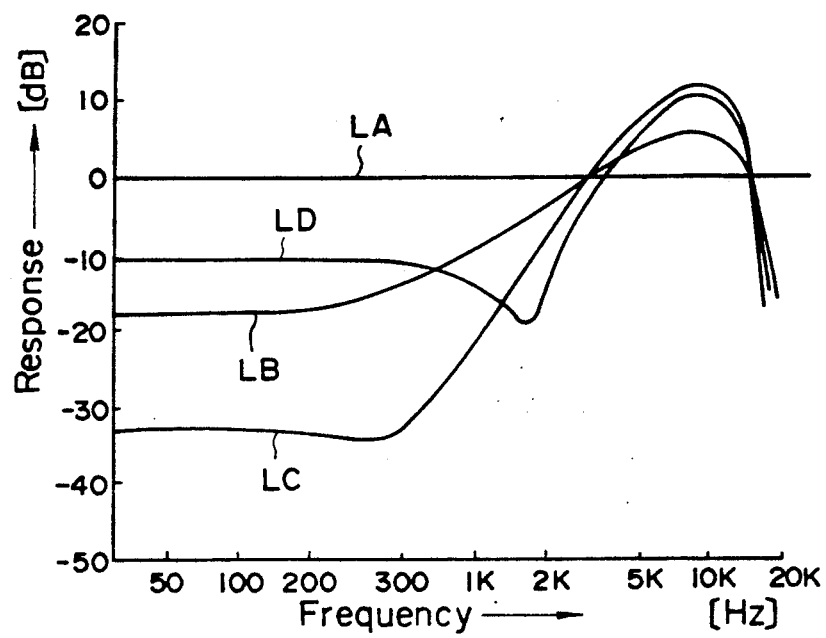
FIG. 22 is a characteristic curve diagram of a predictive filter employed in the embodiment of FIG. 21.

Therefore, as shown in FIG. 22, the predictive filters 61A, 61B, 61C, 61D and the subtracters 67A, 67B, 67C, 67D constitute filter circuits which have frequency characteristics represented by curves LA, LB, LC and LD respectively. And the input digital signal $S_I$ is corrected with such frequency characteristics to become predictive residual signals $S_{ZA}$, $S_{ZB}$, $S_{ZC}$ and $S_{ZD}$, which are then fed to L-word delay circuits 68A, 68B, 68C, 68D and maximum absolute value holding circuits 69A, 69B, 69C, 69D, respectively.

In this manner, the subtracters 67A–67D constitute predictive error detection means which produce difference signals $S_{ZA}$ - $S_{ZD}$ between the input digital signal $S_I$ and the respective output signals of the predictive filter circuits 61A–61D.

The maximum absolute value holding circuits 69A, 69B, 69C and 69D divide the digital signals received from the adders 69A, 69B, 69C and 69D into blocks of a predetermined period and detect the maximum absolute values in the individual blocks.

A predictive range adaptive circuit 70D produces a filter switching signal $S_{C1}$ on the basis of the detected result and thereby controls switchover of the contacts of a selector circuit 71 in each block, so that the predictive residual signal $S_{ZA}$, $S_{ZB}$, $S_{ZC}$ or $S_{ZD}$ having the smallest one of the entire maximum absolute values is outputted to an adder 72 via the L-word delay circuits 68A, 68B, 68C and 68D and the selector circuit 71.

Consequently, the adder 72 provides per block the predictive residual signal $S_{ZA}$, $S_{ZB}$, $S_{ZC}$ or $S_{ZD}$ having the smallest one of the maximum absolute values (hereinafter referred to as optimal predictive residual signal).

Thus, by requantizing and recording such optimal predictive residual signal, it is rendered possible to attain high-efficiency recording of the input digital signal $S_I$ with a reduced number of bits.

The predictive range adaptive circuit 70D further supplies a floating signal $S_{C2}$ to a multiplier 73 so as to float the optimal predictive residual signal, thereby controlling the maximum value of the optimal predictive residual signal to a predetermined signal level per block.

A requantizer 74 serves to requantize the optimal predictive residual signal posterior to the above floating stage and then outputs the requantized signal.

Subsequently the optimal predictive residual signal is recorded after such floating and requantizing stages, so that the input digital signal $S_I$ can be recorded efficiently with a reduced number of bits.

In the noise shaping circuit 75, the input and output signals of the requantizer 74 are fed to an adder 76, and a requantization error signal $S_E$ obtained as a result is then supplied to a noise filter 78 via a multiplier 77 having a characteristic inverse to that of a multiplier 73.

Similarly to the predictive filters 61A - 61D, the noise filter 78 comprises delay circuits 79, 80, weighting circuits 81, 82 and an adder 83, and supplies its output signal to an adder 72. And in response to the filter switching signal $S_{C1}$ outputted from the predictive range adaptive circuit 70, the noise filter 78 switches the weighting coefficients NA and NB of the weighting circuits 81 and 82 according to the optimal predictive residual signal.

In this embodiment, when a predictive residual signal obtained via the filter 61A is selected as an optimal predictive residual signal in a straight PCM (pulse code modulation) mode, at least one of the two weighting coefficients NA and NB of the noise filter 78 is set to a value other than 0 which has been selected heretofore in the conventional apparatus.

Practically, when the input digital signal $S_I$ is such that its spectral form is emphasized in its higher frequency band, the predictive residual signal obtained via the subtracter 67A has the lowest level out of the entire predictive residual signals obtained via the subtracters 67A, 67B, 67C and 67D, so that the predictive residual signal $S_{ZD}$ is selected and supplied to the requantizer 74 (i.e. a straight PCM mode is selected).

Therefore, by setting at least one of the weighting coefficients N1 and N2 to a value other than 0, a great amount of the lower frequency component of the quantization error signal is fed back via the noise filter 78, so that the requantization noise, which originally has a flat spectral form due to setting of the weighting coefficient N1 or N2 to a value 0, is switched over to another spectral form suppressed in its lower frequency band.

As a result, the requantization noise outputted via the requantizer 74 is so processed as to have a spectral form emphasized in its higher frequency band correspondingly to the amount of such suppression in the lower frequency band.

Thus, in the straight PCM mode where the lower frequency component in the spectral form of the requantization noise is suppressed, it becomes possible to aurally improve the signal-to-quantization noise ratio to eventually achieve effective avoidance of generation of offensive requantization noise by an amount corresponding to such suppression. And in any other operation mode, such error signal is fed back after being corrected in accordance with the frequency characteristic of the corresponding predictive filter 61B, 61C or 61D.

In the above embodiment, the predictive filters 61A–61D employed are maximally of second order. However, it is also possible to use primary or first-order filters with changes of the coefficients K thereof. In such a modification, the coefficient K becomes 0 in the straight PCM mode, but the same effect as the above is obtainable by setting the coefficient N1 of the noise filter to a value greater than 0, e.g. to 0.7.

Relative to the noise shaping filter in the fifth embodiment, tertiary or third-order filters may be employed in place of the predictive filters 61A–61D which are maximally of second order. In such a modification, a further improvement is achievable in the aural signal-to-noise ratio. In an exemplary constitution, the requantization noise $S_n$ included in the output signal $S_o$ demodulated on the receiving side is shaped into spectral forms expressed as $$S_n = 1 - 1.33678Z^{-1} + 0.64Z^{-2} \tag{18}$$

$$S_n = 1 - 0.5Z^{-1} \tag{19}$$

$$S_n = 1 - 0.32Z^{-1} \tag{20}$$

Then, in the primary differential PCM mode and the secondary differential PCM mode where the spectrum of the higher frequency band decreases sequentially from that in the straight PCM mode, the spectral form of the requantization noise $S_n$ can be corrected sequentially to a flat spectral form in accordance with such decrease of the spectrum, so that the signal-to-quantization noise ratio can be improved by utilizing the aural masking effect also in any other mode than the straight PCM mode.

Supposing now that each of the predictive 61A–61D has a frequency characteristic P(Z) and the noise filter 28 has a frequency characteristic R(Z), the spectral form $S_n$ of the requantization noise is expressed as $$S_n = \Delta \frac{1 - R(Z)}{1 - P(Z)} \tag{21}$$

where $\Delta$ denotes a flat frequency characteristic.

Therefore, in selectively determining the spectral form $S_n$ of the requantization noise, the values of F(Z) are set as follows:

$$F(Z) = 1.33678Z^{-1} + 0.64Z^{-2} \tag{22}$$

$$F(Z) = 0.5Z^{-1} \tag{23}$$

$$F(Z) = 0.32Z^{-1} \tag{24}$$

Arranging Eqs. (18) through (20), the spectral form $S_n$ is given by $$S_n = \Delta(1 - F(Z)) \tag{25}$$

Consequently, the relationship represented by the following equation can be obtained from Eq. (25).

$$\Delta \frac{1 - R(Z)}{1 - P(Z)} = \Delta(1 - F(Z)) \tag{26}$$

Solving Eq. (26), therefore, the following relationship is obtained:

$$R(Z) = F(Z) + P(Z) - F(Z) \cdot P(Z) \tag{27}$$

The weighting coefficients in the straight PCM mode, the primary differential PCM mode and the secondary differential PCM mode have a value 0, values 0.9375 and 0, and values 1.796875 and −0.8125 respectively, so that P(Z) can be expressed as $$P(Z) = 0 \tag{28}$$

$$P(Z) = 0.9375Z^{-1} \tag{29}$$

$$P(Z) = 1.796875Z^{-1} - 0.8125Z^{-2} \tag{30}$$

Then the following are obtained by substituting Eqs. (22)–(24) and (28)–(30) for Eq. (27) individually.

$$R(Z) = 1.33678Z^{-1} + 0.64Z^{-2} \tag{31}$$

$$R(Z) = 1.4375Z^{-1} + 0.46875Z^{-2} \tag{32}$$

$$R(Z) = 2.096875Z^{-1} - 1.3515632Z^{-2} + 0.24375Z^{-3} \tag{33}$$

It is thus found therefrom that, in the straight PCM mode, the weighting coefficients N1 and N2 of the first and second multipliers 81 and 82 are to be set to values 1.33678 and 0.64 respectively, and the coefficient N3 and so forth of the third and subsequent multipliers to a value 0.

It is also found that, in the primary differential PCM mode, the weighting coefficients N1 and N2 of the first and second multipliers 81 and 82 are to be set to values 1.4375 and 0.46875 respectively, and the weighting coefficients N3 and so forth of the third and subsequent multipliers to a value 0; while in the secondary differential PCM mode, the weighting coefficients of the first, second and third multipliers 81, 82 and 85 are to be set to values 2.096875, −1.351563 and 0.24375 respectively, and those of the fourth and subsequent multipliers to a value 0.

Thus, in any of the straight PCM mode, the primary differential PCM mode and the secondary differential PCM mode, the filtering characteristic of the noise filter 41 can be changed by selectively switching the weighting coefficients, hence correcting the spectral form of the requantization noise to one of the forms given by Eqs. (18) through (20).

In the constitution mentioned above, the spectral form of the requantization noise can be shaped into a desired one by setting the order of the noise filter 41 to be higher than that of the predictive filter 3 and switching the filtering characteristic of the noise filter 41 in accordance with that of the predictive filter 3, thereby attaining an improvement in the signal-to-quantization noise ratio.

Finally an exemplary modification of the noise shaping filter in the fifth embodiment will be described below.

Figure 23:
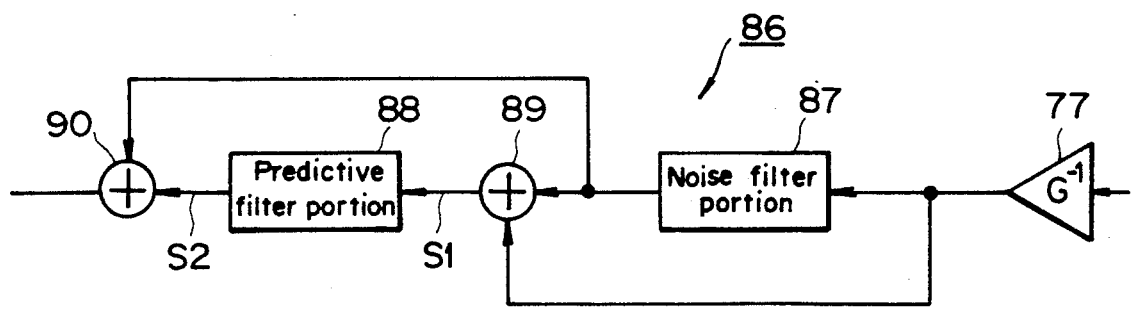
FIG. 23 is a block diagram of another noise shaping filter employed in the fifth embodiment.

A noise filter 86 shown in FIG. 23 is employed in place of the noise filter 78 in the digital signal processing apparatus of FIG. 21 equipped with a noise shaping function.

The noise filter 86 has a noise filter portion 87 and a predictive filter portion 88 whose filtering characteristic is switchable similarly to the aforementioned predictive filters 61A–61D. Such filter portions 87 and 88 are connected in series to each other via an adder 89, and the output signal of a multiplier 77 is fed to both the noise filter portion 87 and the adder 89.

The frequency characteristic A(z) of the noise filter portion 87 is set as $$A(z) = a z^{-1} \tag{34}$$

where $0 < a < 1$

Due to such setting, an output signal S1 corrected to the frequency characteristic expressed by the following equation can be obtained via the adder 89.

$$S1 = 1 + A(z) \quad (35)$$

Meanwhile an adder 90 serves to add the output signals of the predictive filter portion 88 and the noise filter portion 87 to each other and then feeds the result to the adder 72.

Since the output signal S1 is given by Eq. (35) as mentioned, in case the predictive filter portion 88 has a frequency characteristic P(z), an output signal S2 corrected to the frequency characteristic expressed by the following equation is obtained from the predictive filter portion 88.

$$S2 = (1 + A(z)) P(z) \quad (36)$$

Such output signal S2 is added to the output signal of the noise filter portion 87, so that the noise filter 86 as a whole comes to have a filtering characteristic R(z) expressed as $$R(z) = A(z) + P(z)(1 + A(z)) \quad (37)$$

Consequently, with substitution of Eq. (37) for Eq. (21) representing the spectral form of the requantization noise $S_n$, the spectral form of the requantization noise $S_n$ can be shaped into a desired one as $$S_n = \Delta(1 - A(z)) \quad (39)$$

When the secondary differential PCM2 mode, where the predictive gain $\Delta G$ is small in the mid and lower frequency bands, is selected in this embodiment via the predictive filter 61D, the aural signal-to-quantization noise ratio is improved by means of the noise shaping technique as well as in the straight PCM mode.

As graphically shown in FIG. 22, the predictive gain $\Delta G$ is expressed with a positive sign in regard to the gain loss. In the secondary differential PCM2 mode, the predictive gain $\Delta G$ of each filter characteristic in the mid and lower frequency bands below 2 kHz indicates a small value of about 10 to 12 dB. Meanwhile in the primary differential PCM mode with the predictive filter 61B and in the secondary differential PCM1 mode with the predictive filter 61C, such predictive gain $\Delta G$ indicates a great value of 25 to 13 dB and 37 to 23 dB, respectively.

In the above-described digital signal processing apparatus, when there is selected the secondary differential PCM2 mode where the predictive gain $\Delta G$ is small in the relevant frequency band, the requantization noise $S_n$ becomes offensive to the ear. However, it has been found that the aural requantization noise can be sufficiently suppressed in practical use by adopting the noise shaping process in the straight PCM mode or by flattening the spectral form of the quantization noise in both the primary differential PCM mode and the secondary differential PCM1 mode.

Therefore, when the secondary differential PCM2 mode is selected in this embodiment, the distribution of the requantization noise $S_n$ is raised to the higher frequency band as in the straight PCM mode by utilizing the fact that the spectral form of the input signal $S_I$ is distributed in the mid and higher frequency bands.

As a result, in the secondary differential PCM2 mode, the signal-to-quantization noise ratio can be improved due to the aural masking effect, whereby it is rendered possible to accomplish a satisfactory digital signal processing apparatus which ensures enhancement in the signal-to-quantization noise ratio as compared with the prior art.

In the straight PCM mode and the secondary differential PCM2 mode, the filtering characteristic A(z) of the noise filter portion is set as $$A(z) = 0.71875z^{-1} \quad (40)$$

Meanwhile in the primary differential PCM mode and the secondary differential PCM1 mode, the filtering characteristic A(z) is switched as $$A(z) = 0 \quad (41)$$

From Eq. (39), in the straight PCM mode and the secondary differential PCM2 mode, the distribution of the requantization noise $S_n$ is raised to the higher frequency band as represented by the following equation.

$$S_n \Delta (1 - 0.71875z^{-1}) \quad (42)$$

Meanwhile in the primary differential PCM mode and the secondary differential PCM1 mode, a correction is so executed as to flatten the distribution of the requantization noise $S_1$.

According to the above constitution, it becomes possible to attain advantages due to the contrivance that, in addition to the straight PCM mode, the distribution of the requantization error signal is raised to the higher frequency band also in the secondary differential PCM2 mode where the predictive gain $\Delta G$ is small in the mid and lower frequency bands, so that the signal-to-quantization noise ration can be improved by utilizing the aural masking effect in the secondary differential PCM2 mode as well, thereby realizing a superior digital signal processing apparatus which achieves an improved signal-to-quantization noise ratio in comparison with the conventional example.

The embodiment described above is concerned with an exemplary case of applying the present invention to a digital signal processing apparatus which is capable of performing its operation in a straight PCM mode, a primary differential PCM mode, a secondary differential PCM1 mode and a secondary differential PCM2 mode. However, it is to be understood that the present invention is not limited to such embodiment alone and may also be applied widely to various digital signal processing apparatus designed for transmission of digital signal with the adaptive predictive coding.

Furthermore, the present invention is not restricted merely to the above example of raising the distribution of the requantization noise $S_n$ to the higher frequency band in both the straight PCM mode and the secondary differential PCM2 mode. And in any digital signal processing apparatus equipped with some other mode than the aforementioned ones, its constitution may be so contrived as to raise the distribution of the requantization noise $S_n$ to the higher frequency band in case the predictive gain $\Delta G$ is small in the mid and lower frequency bands.

What is claimed is:

1. An apparatus for processing a quantized digital signal, comprising:

a predictive filter;

means connected to receive an input signal and to receive an output signal from said predictive filter for producing a difference signal responsive thereto;

requantizer means for requantizing said difference signal;

inverse requantizer means connected to said requantizer means for requantizing the output signal of said requantizer means to produce an inverse quantized signal with an inverse characteristic;

signal combining means for supplying a weighted signal to said predictive filter, said signal combing means including weighting means for receiving said inverse requantized signal and for producing a first weighted signal, and second means for receiving said difference signal and said first weighted signal for producing a second weighted signal, and means to provide said second weighted signal to said predictive filter;

said first and second weighted signals each being weighted by a predetermined amount relative to each other.

2. Apparatus according to claim 1, including a feedback filter having a predetermined frequency characteristic, said feedback filter being connected to receive a combination signal derived from the output signal of said inverse requantizer means and from the input signal of said requantizer means, said combination signal being weighted by a predetermined amount, and means for connecting said feedback filter to said predictive filter and to said requantizer means.

3. Apparatus according to claim 2, wherein said feedback filter consists of a plurality of filters.

4. Apparatus according to claim 1, including noise shaping means connected between said inverse requantizer and said predictive filter for correcting the spectral form of requantization noise generated in requantizing said output signal, whereby the spectral form of said requantization noise is approximated to that of the input signal while being suppressed in the lower frequency band.

5. Apparatus according to claim 1, wherein said predictive filter incorporates a plurality of predictive filters, and said difference signal producing means comprises a plurality of subtractors, each connected to an input signal and to an output signal of one of said predictive filters, said plurality of predictive filters having different characteristics whereby one of the difference signals produced by said difference signal producing means is equal in frequency characteristic to one of said input signals, and means for selecting said one difference signal for connection to said requantizer means, whereby the lower frequency component of the signal produced by said requantizer means is suppressed when it receives input signal corresponding to said one difference signal, and means for supplying said one difference signal to said requantizer means.

6. Apparatus according to claim 1, including a noise filter connected between said requantizer means and said predictive filter, wherein the order of said noise filter is set to be higher than the order of said predictive filter.

7. Apparatus according to claim 1, including a noise filter interconnected between said inverse requantizer and said requantizer means for feeding back to said requantizer means the requantization error signal generated during the requantization, and means for switching the characteristics of said predictive filter and simultaneously switching the characteristic of said noise filter, whereby said predictive filter selects a small predictive gain in the mid and lower frequency bands, and said noise filter raises the distribution of said requantization error signal to the higher frequency band.

* * * * *